May 5, 1970 R. H. McDONALD 3,510,864

PAGING ENCODER

Filed Aug. 17, 1967 3 Sheets-Sheet 1

INVENTOR
RAMSEY H. McDONALD

BY Woodard, Weikart, Emhardt & Naughton
Attorneys

PAGING ENCODER

Filed Aug. 17, 1967 3 Sheets-Sheet 2

INVENTOR.
RAMSEY H. McDONALD

BY
Woodard, Weikart, Emhardt & Naughton
Attorneys

| POSITION | FIRST TONE | SECOND TONE |
|---|---|---|
| 1 | A | B |
| 2 | A | C |
| 3 | A | D |
| 4 | A | E |
| 5 | A | F |
| 6 | A | G |
| 7 | A | H |
| 8 | B | A |
| 9 | B | C |
| 10 | B | D |
| 11 | B | E |
| 12 | B | F |
| 13 | B | G |
| 14 | B | H |
| 15 | C | A |
| 16 | C | B |
| 17 | C | D |
| 18 | C | E |
| 19 | C | F |
| 20 | C | G |
| 21 | C | H |
| 22 | D | A |
| 23 | D | B |
| 24 | D | C |
| 25 | D | E |
| 26 | D | F |
| 27 | D | G |
| 28 | D | H |

| POSITION | FIRST TONE | SECOND TONE |
|---|---|---|
| 29 | E | A |
| 30 | E | B |
| 31 | E | C |
| 32 | E | D |
| 33 | E | F |
| 34 | E | G |
| 35 | E | H |
| 36 | F | A |
| 37 | F | B |
| 38 | F | C |
| 39 | F | D |
| 40 | F | E |
| 41 | F | G |
| 42 | F | H |
| 43 | G | A |
| 44 | G | B |
| 45 | G | C |
| 46 | G | D |
| 47 | G | E |
| 48 | G | F |
| 49 | G | H |
| 50 | H | A |
| 51 | H | B |
| 52 | H | C |
| 53 | H | D |
| 54 | H | E |
| 55 | H | F |
| 56 | H | G |

Fig. 4.

INVENTOR.
RAMSEY H. McDONALD

BY
Woodard, Weikart, Emhardt & Naughton
Attorneys

United States Patent Office 3,510,864

Patented May 5, 1970

3,510,864

PAGING ENCODER

Ramsey H. McDonald, P.O. Box 565,
Richmond, Ind. 47374

Filed Aug. 17, 1967, Ser. No. 661,300
Int. Cl. H04m *11/02*
U.S. Cl. 340—311 5 Claims

ABSTRACT OF THE DISCLOSURE

An apparatus for receiving and storing a plurality of paging signals, encoding the paging signals into a tone sequence code and operating a radio transmitter to broadcast the tone sequence codes to activate a plurality of portable paging receivers, each receiver being responsive to only one tone sequence code.

BACKGROUND OF THE INVENTION

Field of the invention

The field of the invention is generally switching systems and more particularly selective signaling systems.

Description of the prior art

Selective radio paging by the use of tone sequence encoding is well known in the art. In operation, the RF carrier of a radio transmitter is modulated by a sequence of audio tones. Radio paging receivers tuned to the frequency of the RF carrier detect the tone sequence transmitted. If the transmitted tone sequence corresponds to the tone sequence for which a particular receiver's discriminator circuits are tuned, that receiver emits a "beep" signaling its wearer that he is being paged. The wearer may then go to a predetermined location, call a predetermined telephone number, or carry out any other prearranged plan.

Tone sequence radio paging has found wide application in private radio systems, but has been fairly limited in its application to common carrier radio systems. The main reason for this has been that when one person was being paged, the paging system was unable to receive and store the information that another person was to be paged.

The present invention solves this problem of providing an apparatus capable of receiving and storing such information, and further, permits increased efficiency of operation by providing a circuit that inhibits the apparatus from keying the radio transmitter while the transmitter is being used for voice communication and releases the transmitter for voice communication after carrying out a paging operation.

SUMMARY OF THE INVENTION

One embodiment of the invention may include a paging encoder having a plurality of bistable memory units for receiving and storing paging information, a plurality of tone generators and a multi-bank stepping relay. There is one memory unit for each paging code. The memory units may be connected to individual push buttons, telephone lines, or both. When a memory unit is triggered, for example by a push button, it changes state and sets up an enabling circuit. The enabling circuit may include a normally closed contact on the transmitter keying relay so that if the transmitter is in use, the enabling circuit will not be completed. When the transmitter is free, the enabling circuit is completed and the apparatus seizes control of the transmitter, thereby preventing the transmitter from being used for voice communication, and triggers the stepping relay to advance from its "home" position.

The stepping relay is of the self-stepping variety and continues to advance until it comes to rest on a point connected to triggered memory unit. At this point, the stepping relay halts and timing circuits are energized. The timing circuits key the transmitter and operate gating circuits to send a tone code sequence over the transmitter. The particular tone sequence transmitted is predetermined by interconnections between the plurality of tine generators and points on the stepping relay.

After the tone sequence has been transmitted, the transmitter is unkeyed and the stepping relay permitted to continue stepping. Upon stepping to the point immediately following a triggered memory unit, that memory unit is reset and thereby made ready for further use. The stepping relay continues to advance until it reaches another point connected to a triggered memory unit or until it reaches the "home" position. When all of the memory units have been reset, the apparatus releases control of the transmitter, thereby making it available for voice communication.

It will be seen that the apparatus of the present invention, by storing paging information and automatically seizing and releasing control of a radio transmitter, provides a paging system suitable for use with common carrier radio installations.

It is therefore an object of the present invention to provide an improved paging encoder.

It is a further object of the present invention to provide a paging encoder adapted to store paging information while the paging encoder is in operation or when an associated transmitter is not available.

It is still a further object of the present invention to provide a paging encoder that will store paging information until its associated transmitter is free, then seize the transmitter and transmit tone sequence paging codes.

It is yet another object of the present invention to provide a paging encoder that will release the transmitter after all of the stored paging information has been encoded into tone sequences and transmitted.

These and other objects and advantages of the present invention will become apparent as the description of the preferred embodiment proceeds, reference being made to the attached drawings and appended claims.

BRIEF DESCRIPTION OF THE DRAWINGS

FIG. 4 is a table showing the tone combinations for a two-tone sequence codes using eight tones.

DESCRIPTION OF THE PREFERRED EMBODIMENTS

Figure 1:
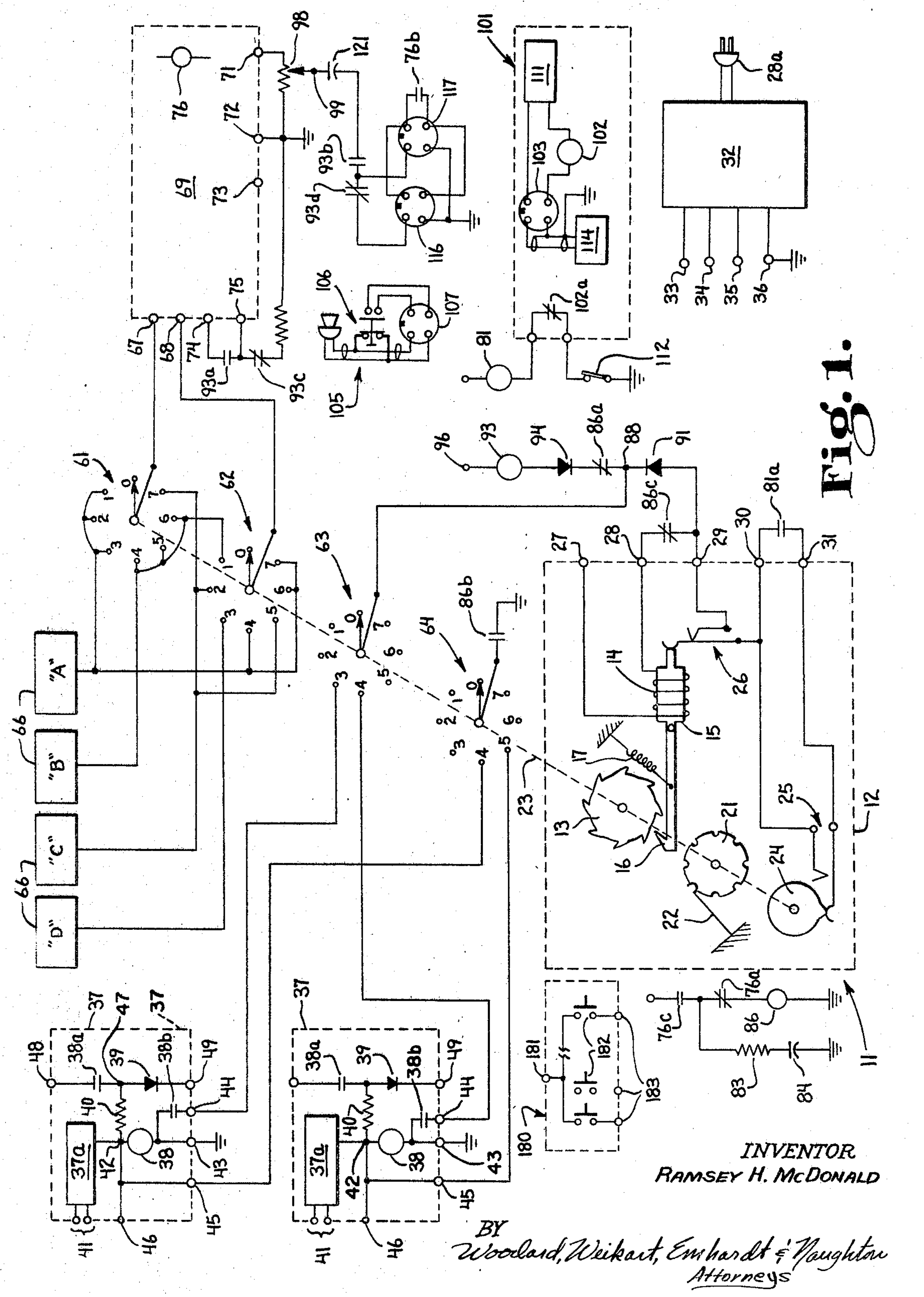
FIG. 1 is a schematic diagram of the apparatus of the present invention.

FIG. 1 shows the apparatus of the present invention including a four-bank stepping relay, indicated generally at 11, and having an advancing mechanism enclosed within the broken line 12. The advancing mechanism includes a toothed wheel 13, a stepping solenoid having a coil 14 and an armature 15 coupled to a pawl 16 that is held in engagement with the toothed wheel 13 by a spring 17.

There is also a detent wheel 21 having a plurality of detents about its circumference for, engagement with a detent spring 22. The toothed wheel 13 and the detent wheel 21 are mounted upon a shaft indicated by the broken line 23. As will be explained in more detail subsequently, a wiper arm of each bank of the four-bank stepping relay is also mounted upon the shaft 23. A cam wheel 24 is also mounted upon the shaft 23.

The advancing mechanism 12 also includes a momentary switch 25 operated by the cam wheel 24 and a momentary switch 26 operated by the armature 15.

The stepping relay 11 includes terminals 27, 28, 29, 30 and 31 for the connection of external wiring. The solenoid coil 14 is connected between terminals 27 and 28, the momentary switch 26 is connected between terminals 29 and 30 and the momentary switch 25 is connected between the terminals 30 and 31. Terminal 31 is externally connected to ground.

The apparatus of the present invention includes a power supply, indicated generally at 32, and having output terminals 33, 34, and 35. A common terminal 36 is connected to ground. The power supply 32 may be connected to a source of 120 volt, 60 cycle current as indicated by the plug 28*a*.

There are a plurality of memory units, indicated generally by the broken lines 37, which may include a ring detector circuit 37*a*, a line relay having a coil 38 and contacts 38*a* and 38*b* a diode 39 and a resistor 40. The ring detector circuit 37*a* has a pair of terminals 41 for connection to a telephone line and by means well known in the art is adapted to produce a positive DC voltage at a junction 42 whenever telephone ringing current is present at the terminals 41. One side of the relay coil 38 is connected to the junction 42. The other side of the coil 38 is connected directly to a terminal 43 and through the contact 38*b* to a terminal 44. The junction 42 is connected to a terminal 45 and may also be connected to a terminal 46. The resistor 40 is connected between the junction 42 and a junction 47. The junction 47 is connected through the contact 38*a* to a terminal 48 and through the diode 39 to a terminal 49. The diode 39 is oriented to permit the flow of current when the junction 47 is positive with respect to the terminal 49, but to block the flow of current when the terminal 49 is positive with respect to the junction 47.

The stepping switch 11 has four banks of contacts indicated at 61, 62, 63 and 64. For the sake of simplicity, an eight-position stepping relay 11 is illustrated in FIG. 1, however, it should be understood that the number of positions is not limited. As will be described in more detail subsequently, a fifty-two position stepping relay has been used quite satisfactorily in a prototype of the present invention.

There are a plurality of tone generators 66, each of which generates a tone having a frequency of 3,000 cycles per second or less in order to comply with a ruling of the Federal Communications Commission.

Again, for the sake of simplicity, only four tone generators 66 are illustrated in FIG. 1. The number of tone generators 66 required depends upon the number of unique paging codes desired. The number of unique codes which may be formed with a given number of tone generators is given by the formula $n!/(n-p)!$, where $n$ is the number of tone generators and $p$ is the number of tones required for each unique code. For example, with the four tone generators 66 as illustrated in FIG. 1, and using two tone codes sequentially to generate a unique code, $4!(4-2)=4!/2!=4\times3=12$ possible codes. Similarly, with eight tone generators and a two tone code, $8\times7$, or 56 unique codes could be formed. These fifty-six possible unique codes are illustrated in the table of FIG. 4.

Each of the tone generators 66 generates a different frequency tone, indicated by the letters A, B, C, and D. The outputs of the tone generators 66 are connected to the banks 61 and 62 of the stepping relay 11. The wiper contacts of the banks 62 and 61 are connected to terminals 67 and 68, respectively, of a timing and gating circuit indicated generally at 69. The timing and gating circuit also has terminals 71, 72, 73, 74 and 75, and includes a relay having a coil 76, a normally closed contact 76*a* and normally open contacts 76*b* and 76*c*. There may also be a normally closed contact 76*d* and a normally open contact 76*e*.

The function of the timing and gating circuit 69 is to first gate to the terminal 71 the signal applied at terminal 67 and then to gate to the terminal 71 the signal applied to the terminal 68. With reference to FIG. 1 it will be seen that with the stepping relay 11 at position 1 the gated sequence of tones is AB. In position 2, the sequence is AC; in position 3, AD; in position 4, BA; in position 5, BC; in position 6, BD; and in position 7, CA. Thus, it will be seen that the tone code sequence is determined by the position of the stepping relay 11.

The position of the stepping relay 11 is controlled by the memory units 37, banks 63 and 64 of the stepping relay 11 and the timing and gating circuit 69. All of the terminals 48 are connected to a positive DC voltage source, for example, terminal 33 of the power supply 32. All of the terminals 43 are connected to ground. All of the terminals 49 are connected together and to one side of a relay coil 81, the other side of which is connected to ground. As will be explained in more detail subsequently, the other side of the coil 81 may be connected directly to ground or may be connected through one or more switches or relay contacts to ground. The relay coil 81 operates normally open contacts 81*a* connected across terminals 30 and 31 of the stepping relay 11.

One side of the normally closed contact 76*c* is connected to a source of positive DC voltage, such as the terminal 35 of the power supply 32. Its other side is connected to one side of normally open contact 76*a* and to one side of a resistor 83 which is connected to ground through a capacitor 84. The other side of contact 76*a* is connected to one side of a relay coil 86 which has its other side connected to ground.

The relay coil 86 operates normally closed contacts 86*a* and 86*c* and a normally open contact 86*b*. The contact 86*c* is connected across terminals 28 and 29 of the stepping relay 11.

The terminal 44 of each memory unit 37 is connected to one of the points on the bank 63 and the terminal 45 of each memory unit 37 is connected to one of the points on the bank 64 of the stepping relay 11. The wiper terminal of the bank 64 is connected to ground through the contact 86*b* and the wiper terminal of the bank 63 is connected to a junction 88.

A diode 91 is connected between the terminal 29 of the stepping relay 11 and the junction 88. Its orientation permits easy flow of current from terminal 29 to junction 88 but opposes a flow of chrrent from jnnction 88 to terminal 29.

A relay having a coil 93 is connected in series with a diode 94 and contacts 86*a* between a junction 96 and the junction 88. The junction 96 is connected to a source of positive DC voltage, such as terminal 35 of the power supply 32.

The relay coil 93 operates normally open contacts 93*a* and 93*b* and normally closed contacts 93*c* and 93*d*. The contact 93*a* is connected across terminals 74 and 75 of the timing and gating circuit 69. The contact 93*c* connects one side of a resistor 97 to the terminal 75. The other side of the resistor 97 is connected to terminal 72 and to ground. A potentiometer 98 has its end terminals connected to terminals 71 and 72 and its wiper terminal connected to a junction 99.

The apparatus is adapted to operate in conjunction with a radio base station transmitter 101 having a keying relay with a coil 102. The transmitter may have a four-pin jack 103 for connecting a microphone 105 having a push-to-talk switch 106, and a plug 107 to match the jack 103.

Within the transmitter 101 there may be a power supply 111 for supplying power to the keying relay 102. When the plug 107 is inserted in the jack 103, the push-to-talk switch 106 is connected in series with the coil 102 so that when the switch is depressed the coil 102 is energized to operate contacts (not shown) to key the plate power of the transmitter and may also operate auxiliary contact 102*a*. When the push-to-talk switch 106 is not depressed, normally closed contacts may mute the microphone 105. As mentioned earlier, a relay contact may be connected between the relay coil 81 and ground. FIG. 1 shows the contact **102*a* so connected, and also shows a manually controlled switch 112 connected in series between the contact 102*a* and ground. The function of these will be described subsequently. Also, when the plug 107 is inserted in the jack 103, the microphone 105 may be connected to a pre-amp 114 in the transmitter 101**.

For convenience, the apparatus of the present invention may be provided with a pair of jacks 116 and 117 of the same type as the jack 103 of the transmitter. The microphone plug 107 may be inserted into the jack 116 and a patch cord having plugs on each end be connected between the jack 117 and the jack 103.

As shown in FIG. 1, one side of a coupling capacitor 121 is connected to the junction 99. The other side of the capacitor 121 is connected through contact **93*b*, jack 117 and jack 103 to the transmitter pre-amp 114. One of the leads from the microphone 105 is connected through the jack 116, the contact 93*d* and jacks 117 and 103 to the pre-amp 114. The contact 76*b* is connected to two pins of the jack 117 so that it is in parallel with the contact of push-to-talk switch 106 connected to the keying relay 102** of the transmitter.

Figure 2:
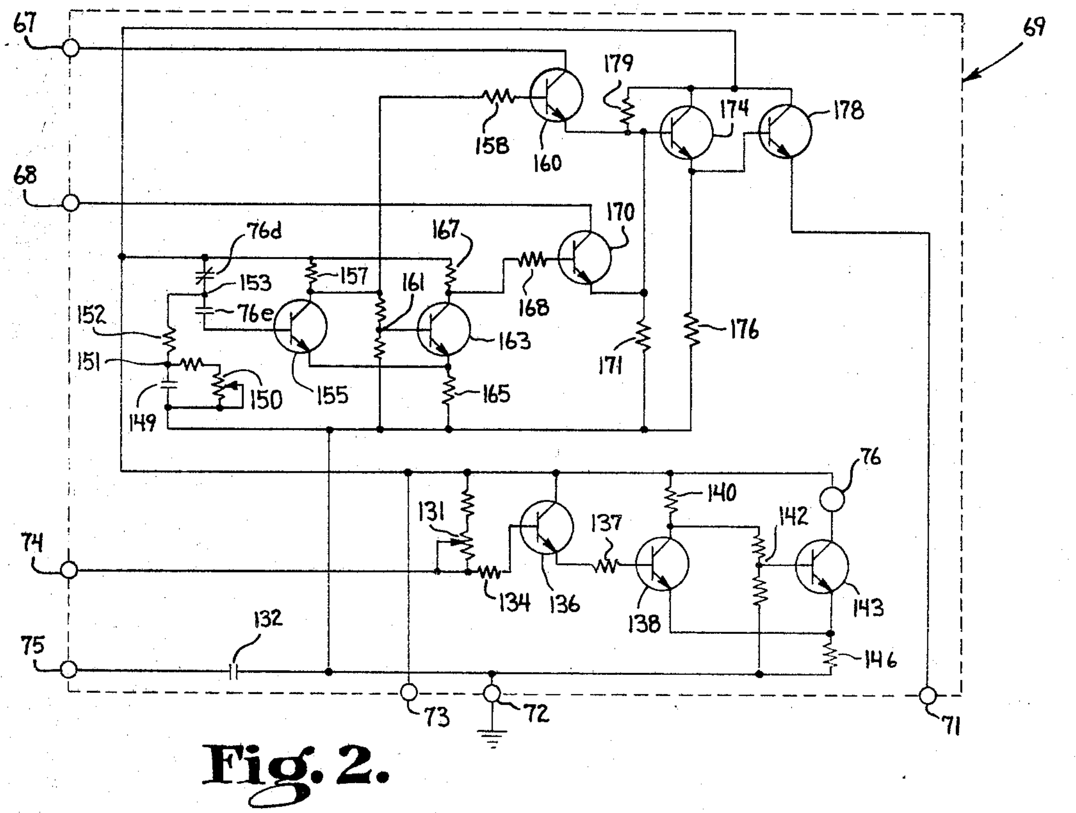
FIG. 2 is a schematic diagram of the timing and tone gating circuits of the present invention.

Referring now to FIG. 2, there is shown the timing and tone gating circuit 69 of the present invention. The terminal 72 is connected to ground and the terminal 73 is connected to a source of positive DC voltage, such as terminal 35 of the power supply 32. A variable resistance 131 is connected between terminal 73 and terminal 74. A capacitor 132 is connected between terminal 75 and terminal 72. Terminal 74 is also connected through a resistor 134 to the base of a transistor 136. The collector of the transistor 136 is connected to terminal 73 while the emitter is connected through a resistor 137 to the base of a transistor 138. The collector of the transistor 138 is connected through a resistor 140 to terminal 73, and through a voltage divider 142 to the base of a transistor 143. The emitter of transistor 138 is connected to the emitter of transistor 143 and through a resistor 146 to terminal 72. One side of the relay coil 76 is connected to terminal 73 while the other side is connected to the collector of transistor 143.

A capacitor 149 and a variable resistor 150 are connected in parallel between terminal 72 and a junction 151. A resistor 152 is connected between the junction 151 and a junction 153. The junction 153 is connected to terminal 73 through contact **76*b*, and is connected to the base of a transistor 155 through contact 76*e*. The collector of the transistor 155 is connected through a resistor 157 to terminal 73, through a resistor 158 to the base of a transistor 160, and through a voltage divider 161 to the base of a transistor 163. The emitter of transistor 155 is connected to the emitter of transistor 163 and through a resistor 165 to terminal 72. The collector of transistor 163 is connected through a resistor 167 to terminal 73 and through a resistor 168 to the base of a transistor 170. The emitters of transistors 160 and 170 are connected together and are connected through a resistor 171 to terminal 72. The emitters of transistors 160 and 170 are also connected to the base of a transistor 174. The emitter of the transistor 174 is connected to the base of a transistor 178 and through a resistor 176 to terminal 72. The collectors of transistors 174 and 178 are connected together and to terminal 73. A resistor 179 is connected between the collector and base of transistor 174. The collector of transistor 160 is connected to terminal 67 and the collector of transistor 170 is connected to terminal 68. The emitter of transistor 178 is connected to terminal 71**.

Figure 3:
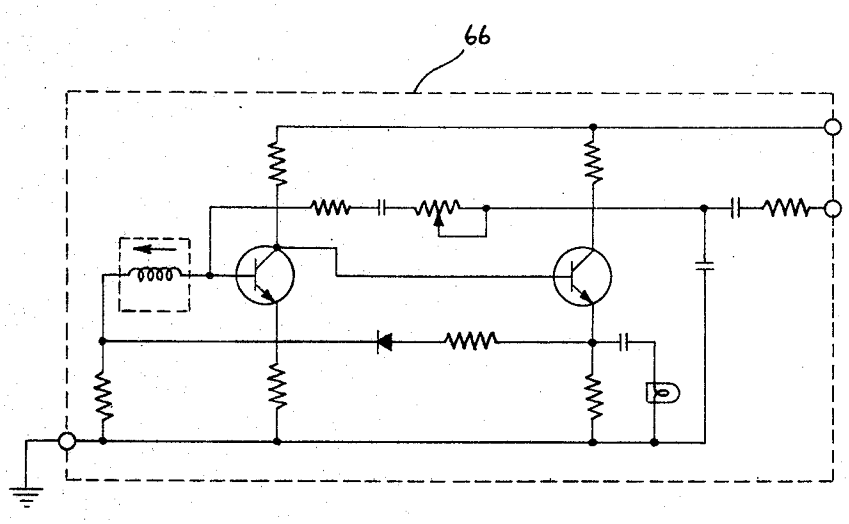
FIG. 3 is a schematic diagram of one type of tone generator adaptable for use with the present invention.

Referring now to FIG. 3, there is shown the details of a tone generator 66 adapted for use with the present apparatus. The details of the tone oscillator 66 do not constitute a part of the present invention and are shown merely for the sake of clarity and completeness.

In addition to the ring detector circuits **37*a* for connection to telephone lines, the present apparatus may be provided with a push button selector panel 180 having a terminal 181, a plurality of push button switches 182 and a plurality of terminals 183. One side of each of the push button switches 182 is connected to terminal 81. The other side of each push button switch 182 is connected to a terminal 183. The terminal 181 is connected to the same source of positive DC voltage as the terminals 48 of the memory units 37 and each of the terminals 183 is connected to a terminal 46 of a memory unit 37. In this manner, the line relay coils 38 of the memory units 37 may be selectively energized by the push buttons 182 as well as by the ring detector circuits 37*a***.

In operation, a telephone number may be dialed that will cause ringing current to be impressed across one of the pairs of terminals 41 or, locally, a push button 182 may be depressed. Either event causes a positive DC voltage at the junction 42 of the selected memory unit 37. This energizes the relay coil 38 to close contacts **38*a* and 38*b*. Contact 38*a* connects positive voltage through the resistor 40 to maintain coil 38 energized and connects positive voltage to terminal 49. Simultaneously contact 38*b* connects a point of bank 63** to ground.

Energizing terminal 49 connects positive DC voltage to one side of the coil 81. If the switch 112 is open or if contact **102*a* is open, coil 81 will not be energized. However, if the transmitter is not in use contact 102*a* will be closed. If, in addition, switch 112 is closed, coil 81 will close its contact 81*a*. Closure of contact 81*a* applies ground to one side of solenoid coil 14 through the switch 26 and normally closed contact 86*c*. With the coil 14 energized, the armature 15 is moved to the left simultaneously latching the pawl 16 over one of the teeth of the toothed wheel 13 and opening the switch 26. The opening of switch 26 deenergizes the coil 14 permitting the spring 17 to return the armature 15 and pawl 16 to rotate the stepping relay to its next position. When the shaft 23 is rotated away from its "home" position the cam wheel 24 permits the switch 25 to close in parallel with contact 81*a*. As the armature 15 is returned, the switch 26 is reclosed to reenergize the coil 14 to again move the armature to the left and open the switch 26. This stepping motion continues until the wiper contact of bank 63 reaches a point connected to ground through a contact 38*b*. When this happens, junction 88 is connected to ground. With junction 88 at ground potential, switch 26 is bypassed by normally closed contact 86*c* and diode 91. This stops the stepping action of switch 26 and maintains coil 14** energized.

With junction 88 at ground potential, coil 93 is simultaneously energized through diode 94 and normally closed contact **86*a*. Contacts 93*a* and 93*b* close and contacts 93*c* and 93*d* open. This action disconnects capacitor 132 from ground and connects it through the variable resistor 131 to positive DC voltage. Simultaneously contacts 93*b* and 93*d* disconnect the microphone and connect the output of the timing and tone gating circuit 69** to the transmitter.

With the capacitor 132 connected to the variable resistor 131, charging current flows through the resistor 131. The initial voltage across the capacitor 132 is zero which, when the contacts 93 operate, biases transistor 136 to cut off. This in turn biases transistor 138 to cut off and biases transistor 143 into conduction. Conduction of transistor 143 energizes coil 76 to activate the transmitter by closing contact **76*b*, this connects the series-parallel RC circuit including capacitor 149 and resistors 150 and 152 from positive DC voltage and connects it to the base of transistor 155. This biases transistor 155 into conduction, dropping the collector voltage of transistor 155 and biasing to cut off transistors 163 and 160. With transistor 160 biased off, the tone input at terminal 67 is blocked from reaching the output terminal 71. Simultaneously, the collector voltage of transistor 163 rises biasing transistor 170 into conduction. With transistor 170 in conduction, the tone applied to terminal 68 is permitted to pass to the emitter followers, transistors 174 and 178, and to the output terminal 71**.

As capacitor 149 discharges the bias voltage applied to the base of transistor 155 falls until transistor 155 is biased to cut off. When this happens the collector voltage of transistor 155 increases while its emitter voltage decreases. These changes cause transistor 170 to conduct and transistor 160 to shut off, thus blocking the tone from terminal 67 and gating the tone from terminal 68.

When capacitor 132 reaches a certain charge, the base bias voltage of transistor 136 is sufficiently large that transistor 136 is biased on. This biases transistor 138 into conduction which in turn biases transistor 143 off thereby deenergizing coil 76. Contact **76*d* opens to release the transmitter, contact 76*e* opens to disconnect resistor 152 from the base of transistor 155, contact 76*d* recloses to connect resistor 152 to positive DC voltage so that capacitor 149** may recharge.

When coil 76 was energized, it also operated contacts **76*a* and 76*c*. The closure of contact 76*c* connected capacitor 84 through resistor 83 to positive DC voltage. Simultaneously, contact 76*a* disconnected coil 86 from resistor 83. During the time coil 76 was energized, capacitor 84 was charging. Now, upon the release of coil 76, contact 76*c* opens and contact 76*a* closes to connect capacitor 84, resistor 83 and coil 86 in series. Capacitor 84 then discharges through resistor 83 and coil 86 to momentarily energize coil 86 to open contact 86*a* to interrupt the circuit through coil 93, close contact 86*b* to connect the wiper contact of bank 64 to ground, and open contact 86*c* to deenergize coil 14 and permit the spring 17 to return the pawl 16 and armature 15 to the right to advance the stepping relay to the next position. Capacitor 84 and resistor 83 are so sized that coil 86 will remain energized momentarily after the stepping relay 11 has advanced to the next position. Immediately upon advancing to the next position, bank 64 connects terminal 45 of the memory unit to ground through contact 86*b*. This drops the potential across the coil 38 to zero, permitting it to open its contacts 38*a* and 38*b*, thus readying the memory unit 37** to receive another paging signal.

The stepping relay 11 will again continue to advance until the wiper of bank 63 encounters another grounded point, indicating that a memory unit is storing paging information. When this happens, the operation described above is repeated, the only different in operation being the combination of tones applied to terminals 67 and 68 for transmission to a different paging receiver. If no more grounded points are encountered on bank 63, the stepping relay 11 will continue to advance until it reaches the "home" position, whereupon the cam wheel 24 opens the switch 25 to deenergize the coil 14. The stepping relay 11 cannot advance again until contact **81*a*** is momentarily closed.

Therefore, if the transmitter is not in use for voice communications so that contact **102*a* is closed and if switch 112 is closed, operation of any memory unit 37 will energize coil 81 to close contact 81*a* and start the stepping relay advancing again. If voice communication requirements are heavy, an operator may open switch 112 to prevent the apparatus from seizing control of the transmitter. With switch 112 open the apparatus will store the paging information in the memory units 37. Upon closure of switch 112, with the transmitter idle, coil 81 will be energized to close contact 81*a* to start stepping relay 11** advancing. In this manner, the operation may be made quite efficient, giving the operator the option of allowing the apparatus to automatically seize control of the transmitter whenever a memory unit receives a paging signal or to set the apparatus to store paging information until the operator is finished with several voice messages and then permit it to seize control of the transmitter.

It will be apparent from the above description that the present invention provides an improved paging encoder especially suited for use in common carrier radio systems. It may be connected to push buttons or to telephone lines, or both, and can store paging information while its associated transmitter is in use for voice communication. Furthermore, by storing paging information, it is capable of receiivng a plurality of paging calls simultaneously.

As mentioned above, the number of points on the stepping relay 11 is not limited. The prototype of the present invention mentioned above used a 52-point stepping relay and eight tone generators. The two-tone codes which may be formed with eight tones A, B, C, D, E, F, G and H is shown in FIG. 4.

The invention claimed is:

1. In a dial access paging system adapted to be connected to a radio base station transmitter;

(a) a stepping relay having first, second, third and fourth banks and an advancing mechanism, each of said banks having a plurality of points and a wiper contact;

(b) a plurality of tone generators connected to the plurality of points of the first and second banks, each of said tone generators being arranged to generate a different tone;

(c) a plurality of memory units connected to the plurality of points of the third and fourth banks, said memory units each including a ring detector circuit arranged to actuate said memory unit open receipt of a telephone ringing current;

(d) a timing and tone gating circuit connected to the wiper contacts of the first and second banks and to said transmitter; and (e) an enabling circuit connected to each of the memory units and to the advancing mechanism, the enabling circuit being arranged to enable the advancing mechanism to advance the stepping relay when any of the plurality of memory unit receives and stores a paging signal.

2. The invention according to claim 1 wherein said enabling circuit includes a first contact operated by a transmitter keying relay so that the enabling circuit cannot be completed while the transmitter is in use.

3. The invention according to claim 2 wherein said enabling circuit includes a switch in series with the first contact so that the enablng circuit cannot be completed while said switch is open.

4. The invention according to claim 1 further comprising means for resetting each memory unit after the timing and tone gating circuit has gated the tone code corresponding to the particular memory unit.

5. The invention according to claim 4 wherein the means for resetting each memory unit after the timing and tone gating circuit has gated the tone code corresponding to the particular memory unit includes a third relay coil adapted to be momentarily energized by a capacitor to operate a normally open contact, the contact being connected to the wiper contact of the fourth bank.

References Cited

UNITED STATES PATENTS

| | | | |
|---|---|---|---|
| 3,113,270 | 12/1963 | Bassett | 340—311 X |
| 3,175,191 | 3/1965 | Cohn et al. | 340—311 X |
| 3,230,454 | 1/1966 | Van Burkleo | 340—224 X |
| 2,680,154 | 6/1954 | Dorff | 325—57 X |

JOHN W. CALDWELL, Primary Examiner

M. R. SLOBASKY, Assistant Examiner

U.S. Cl. X.R.

325—55, 57; 340—224